United States Patent
Li et al.

(10) Patent No.: US 10,826,351 B2
(45) Date of Patent: Nov. 3, 2020

(54) MOTOR ROTOR HOLDER AND MOTOR

(71) Applicant: BEIJING GOLDWIND SCIENCE & CREATION WINDPOWER EQUIPMENT CO., LTD., Beijing (CN)

(72) Inventors: Jinhui Li, Beijing (CN); Junwei Liu, Beijing (CN); Wenshou Fan, Beijing (CN)

(73) Assignee: Beijing Goldwing Science & Creation Windpower Equipment Co., Ltd., Beijing (CN)

( * ) Notice: Subject to any disclaimer, the term of this patent is extended or adjusted under 35 U.S.C. 154(b) by 286 days.

(21) Appl. No.: 16/067,121

(22) PCT Filed: Jun. 26, 2017

(86) PCT No.: PCT/CN2017/089984
§ 371 (c)(1),
(2) Date: Jun. 28, 2018

(87) PCT Pub. No.: WO2018/103307
PCT Pub. Date: Jun. 14, 2018

(65) Prior Publication Data
US 2019/0013717 A1 Jan. 10, 2019

(30) Foreign Application Priority Data
Dec. 5, 2016 (CN) .......................... 2016 1 1106672

(51) Int. Cl.
*H02K 9/06* (2006.01)
*H02K 5/20* (2006.01)
(Continued)

(52) U.S. Cl.
CPC ................. *H02K 9/06* (2013.01); *H02K 1/32* (2013.01); *H02K 5/18* (2013.01); *H02K 5/20* (2013.01);
(Continued)

(58) Field of Classification Search
CPC .. H02K 5/20; H02K 5/02; H02K 5/04; H02K 5/08; H02K 9/16; H02K 9/19; H02K 9/18;
(Continued)

(56) References Cited

U.S. PATENT DOCUMENTS 7,878,772 B2 2/2011 Rexhauser et al.
8,686,607 B2 4/2014 Elender et al.
(Continued)

FOREIGN PATENT DOCUMENTS

CN       1835347 A    9/2006
CN    101990732 A    3/2011
(Continued)

OTHER PUBLICATIONS

Chinese Office Action issued in counterpart Chinese Patent Application No. 201611106672.6, dated Aug. 3, 2018.
(Continued)

*Primary Examiner* — Bryan R Perez
(74) *Attorney, Agent, or Firm* — Finnegan, Henderson, Farabow, Garrett & Dunner LLP (57) ABSTRACT

A motor rotor holder and a motor are provided according to the present application. The motor rotor holder is rotatably supported in a housing of the motor, and the motor rotor holder includes: a first cooling channel which allows interior spaces at two axial sides of a rotor in the housing to be in communication with each other so as to direct a first cooling medium through the first cooling channel; and a second cooling channel which is in communication with an exterior
(Continued)

of the housing so as to direct a second cooling medium through the second cooling channel. The first cooling channel and the second cooling channel are provided to have a common heat conduction portion, and the first cooling medium is allowed to exchange heat with the second cooling medium via the common heat conduction portion.

18 Claims, 5 Drawing Sheets

(51) Int. Cl.
    *H02K 5/18* (2006.01)
    *H02K 1/32* (2006.01)
    *H02K 9/04* (2006.01)
    *H02K 9/16* (2006.01)
    *H02K 9/19* (2006.01)

(52) U.S. Cl.
    CPC ............... *H02K 9/04* (2013.01); *H02K 9/16* (2013.01); *H02K 9/19* (2013.01)

(58) Field of Classification Search
    CPC ............ H02K 9/197; H02K 9/20; H02K 9/06; H02K 5/18; H02K 9/04
    See application file for complete search history.

(56) References Cited

U.S. PATENT DOCUMENTS

| | | |
|---|---|---|
| 8,987,952 B2 | 3/2015 | Dutau |
| 9,281,728 B2 | 3/2016 | Buttner et al. |
| 2006/0204371 A1 | 9/2006 | Rexhauser et al. |
| 2008/0272661 A1 | 11/2008 | Zhou et al. |
| 2011/0037330 A1 | 2/2011 | Dutau |
| 2013/0257197 A1 | 10/2013 | Buttner et al. |
| 2015/0069861 A1 | 3/2015 | Büttner et al. |
| 2015/0308456 A1* | 10/2015 | Thompson ............... H02K 9/00 417/244 |
| 2016/0116232 A1 | 4/2016 | Koplow |
| 2016/0352181 A1* | 12/2016 | Randria .................... H02K 5/20 |
| 2017/0163125 A1* | 6/2017 | Granat ..................... H02K 1/32 |

FOREIGN PATENT DOCUMENTS

| | | |
|---|---|---|
| CN | 202172334 U | 3/2012 |
| CN | 103368288 A | 10/2013 |
| CN | 204145182 U | 2/2015 |
| CN | 104935140 A | 9/2015 |
| DE | 102012206199 A1 | 10/2013 |
| EP | 1522749 A1 | 4/2005 |
| JP | S57138839 A | 8/1982 |

OTHER PUBLICATIONS

International Search Report issued in International Application No. PCT/CN2017/089984, mailed from the State Intellectual Property Office of China dated Oct. 11, 2017.

Office Action issued in counterpart Australian Patent Application No. 2017370503, dated May 3, 2019.

Extended Search Report issued by European Patent Office for counterpart application No. 17878486.4 dated Oct. 25, 2019.

* cited by examiner

MOTOR ROTOR HOLDER AND MOTOR

CROSS-REFERENCE TO RELATED APPLICATIONS

This application is a National Phase entry of PCT Application No. PCT/CN2017/089984, filed on Jun. 26, 2017, which claims priority to Chinese Patent Application No. 201611106672.6, titled "MOTOR ROTOR HOLDER AND MOTOR", filed on Dec. 5, 2016, with the State Intellectual Property Office of China, the entire disclosures of all of which are incorporated herein by reference.

FIELD

This application relates to the technical field of motor cooling, and in particular to a motor rotor holder and a motor.

BACKGROUND

As a core device for generating electric energy, transmitting electric energy, using electric energy, and changing characteristics of the electric energy, a motor has a wide range of applications in a large number of industries and sectors in modern society, and, plays an extremely important role in national economy.

Heat losses during operation of the motor mainly come from electromagnetic loss, including Joule heat (that is, copper loss) generated in a windings due to ohmic resistance, magnetic hysteresis loss and eddy-current loss (that is, iron loss) in an iron core and unavoidable stray loss and so on. A permanent magnet motor further includes magnetic steel loss. The loss causes a large amount of heat to be released during the operation of the motor. Excessive heat may not only make a certain impact on the motor itself and an insulation structure thereof, but also shorten insulation lives of components in the motor, even result in a hazard of insulation failure while causing output power of the motor to be reduced continuously. In the case that the motor is a permanent magnet motor, demagnetization of a permanent magnet material may also occur. Once the demagnetization occurs, the performance of the permanent magnet material will be significantly affected, thereby resulting in the performance of the motor inferior to a desired goal. Therefore, a lot of waste heat generated during the operation of the motor must be discharged by necessary cooling measures, so as to ensure normal operation of the motor.

A commonly-used method for cooling a high-rotation-speed motor is to provide an axial fan/a centrifugal fan which is fixedly mounted on rotating components such as a rotating shaft and a rotor holder or is integrally cast with these rotating components for providing necessary cooling circulation power for an interior of the motor. This method can eliminate an independent circulation component in an entire cooling circulation system, and achieve making a cooling medium flow by high-speed rotation of a rotor of the motor. In this way, not only are costs of the independent circulation component and pipelines thereof saved, but also the system is simpler and the structure is more compact.

Most of the conventional cooling methods without a non-independent circulation component, however, only involve constructing a primary cooling circuit in the motor and providing a required drive force for a primary cooling medium. For a motor applied in an environment with strong wind and much sand or in a humid environment, the primary cooling circuit of the motor is required to be a sealed closed loop, and in this case a secondary cooling circuit is required to be constructed outside the motor to cool the primary cooling medium in the primary cooling circuit. Also, a cooler in which convective heat exchange is carried out between the primary cooling medium and a secondary cooling medium is further typically mounted independently to the motor or external to the motor in a form of an externally-installed component or a separately-installed component, which makes an entire motor system complex and the structure large, and further makes the cost much higher.

SUMMARY

According to an embodiment of the present application, a motor rotor holder and a motor are provided. Driven by rotational motion of the motor itself, the motor rotor holder located in the motor can achieve heat exchange between a primary cooling medium and a secondary cooling medium, thus, a heat generation component in the motor is cooled better.

According to an aspect of the present application, a motor rotor holder is provided, and the motor rotor holder is rotatably supported in a housing of a motor, and the motor rotor holder includes: a first cooling channel which allows interior spaces at two axial sides of the rotor in the housing to be in communication with each other so as to direct a first cooling medium through the first cooling channel; and a second cooling channel which is in communication with an exterior of the housing so as to direct a second cooling medium through the second cooling channel. The first cooling channel and the second cooling channel are provided to have a common heat conduction portion, and the first cooling channel is allowed to exchange heat with the second cooling channel via the common heat conduction portion, so as to transfer heat absorbed by the first cooling medium from an interior of the housing to the second cooling medium and discharge the heat to the exterior of the housing.

According to an aspect of the present application, the motor rotor holder includes an inner cylinder, an outer cylinder and an intermediate cylinder located between the inner cylinder and the outer cylinder. The intermediate cylinder is arranged separately from the inner cylinder and the outer cylinder by support components respectively, which allows the first cooling channel to be formed between the intermediate cylinder and the outer cylinder and allows the second cooling channel to be formed between the intermediate cylinder and the inner cylinder. The intermediate cylinder serves as the common heat conduction portion.

According to an aspect of the present application, one or more heat dissipation fins are provided on at least one of the first cooling channel and the second cooling channel.

According to an aspect of the present application, at least one heat dissipation fin of the one or more heat dissipation fins is provided helically in an axial direction of a cooling channel where the at least one heat dissipation fin is located.

According to an aspect of the present application, a circulation direction of the first cooling medium in the first cooling channel is the same as a circulation direction of the second cooling medium in the second cooling channel.

According to an aspect of the present application, the one or more heat dissipation fins are provided in both of the first cooling channel and the second cooling channel, and a direction of the one or more heat dissipation fins in the first cooling channel being arranged helically in the circulation direction of the first cooling medium is the same as a direction of the one or more heat dissipation fins in the second cooling channel being arranged helically in the circulation direction of the second cooling medium.

According to an aspect of the present application, a circulation direction of the first cooling medium in the first cooling channel is opposite to a circulation direction of the second cooling medium in the second cooling channel.

According to an aspect of the present application, the one or more heat dissipation fins are provided in both of the first cooling channel and the second cooling channel, and a direction of the one or more heat dissipation fins in the first cooling channel being arranged helically in the circulation direction of the first cooling medium is opposite to a direction of the one or more heat dissipation fins in the second cooling channel being arranged helically in the circulation direction of the second cooling medium.

According to an aspect of the present application, the one or more heat dissipation fins are provided in both of the first cooling channel and the second cooling channel, and at least one of the one or more heat dissipation fins in the first cooling channel and the one or more heat dissipation fins in the second cooling channel are connected to a cylinder wall of the intermediate cylinder.

According to an aspect of the present application, both of the one or more heat dissipation fins in the first cooling channel and the one or more heat dissipation fins in the second cooling channel are connected to the cylinder wall of the intermediate cylinder.

According to an aspect of the present application, a first cooling fan is provided at an opening of at least one side of the first cooling channel, which allows the first cooling medium to pass through the first cooling channel.

According to an aspect of the present application, the first cooling fan includes one or more fan blades, and the one or more fan blades are connected to the cylinder wall of the intermediate cylinder.

According to an aspect of the present application, a second cooling fan is provided at an opening of at least one side of the second cooling channel, which allows the second cooling medium to pass through the second cooling channel.

According to an aspect of the present application, the second cooling fan includes one or more fan blades, and the one or more fan blades are connected to a cylinder wall of the inner cylinder.

According to an aspect of the present application, the intermediate cylinder is rotationally connected to and sealed with the housing of the motor, so as to define the first cooling channel in the housing and to define the second cooling channel outside the housing.

According to an aspect of the present application, the support components are arranged helically in an axial direction of the first cooling channel and an axial direction of the second cooling channel respectively.

According to an aspect of the present application, the motor rotor holder is made of an aluminum alloy material.

According to an aspect of the present application, a motor is further provided, and the motor includes: a housing; a stator fixedly connected to the housing; a rotor sleeved coaxially with the stator at an inner side of the stator, specifically, an air gap is formed circumferentially between the rotor and the stator; and the above motor rotor holder rotatably provided in the housing. The first cooling channel is in communication with the air gap between the rotor and the stator of the motor, which forms a first circulation circuit for the first cooling medium flowing.

According to an aspect of the present application, the stator is provided axially with one or more channels, and the first cooling channel is in communication with the one or more channels, which forms a second circulation circuit for the second cooling medium flowing.

In summary, in the motor rotor holder according to the embodiment of the present application, the first cooling channel, which is in communication with the spaces at the two axial sides of the rotor in the housing of the motor, and the second cooling channel which is in communication with the exterior of the housing are provided, and the first cooling channel and the second cooling channel are provided to have the common heat conduction portion, such that during operation of the motor the first cooling medium circulating in the first cooling channel and the second cooling medium circulating in the second cooling channel may exchange heat with each other via the common heat conduction portion. Thus, heat generated by the heat generation component is transferred by the first cooling medium to the second cooling medium, and then is discharged by the second cooling medium to the exterior of the housing of the motor. Therefore, effective cooling of the primary cooling medium by the secondary cooling medium is achieved, and it is further ensured that the heat generation component of the motor may be cooled better by the primary cooling medium.

BRIEF DESCRIPTION OF THE DRAWINGS

The present application may be better understood from the following description of embodiments of the present application taken in conjunction with the drawings.

Other features, objects and advantages of the present application will become more apparent by reading the following detailed description of non-limiting embodiments made with reference to the drawings, in which the same or similar reference numerals indicate the same or similar features.

REFERENCE NUMERALS

| | |
|---|---|
| 100. motor, | 10. housing, |
| 11. housing side wall, | 111. cavity, |
| 12. housing side wall, | 121. cavity, |
| 20. stator, | 20a. channel, |
| 201a. second circulation circuit, | 21. stator winding, |
| 30. rotor, | 30a. air gap, |
| 301a. first circulation circuit, | 31. magnetic steel, |
| 40. rotating shaft, | 50. motor rotor holder, |
| 50a. first cooling channel, | 501a. first cooling medium inlet, |
| 502a. first cooling medium outlet, | 50b. second cooling channel, |
| 501b. second cooling medium inlet, | 502b. second cooling medium |

-continued 51. inner cylinder,
52. intermediate cylinder,
521. support stiffening plate,
53. outer cylinder,
531. support stiffening plate,
533. stop flange,
541. fan blade,
543. flow guide plate,
551. fan blade,
561. fan casing,
61. swivel bearing, outlet,
511. axial hole,
52a. channel,
522. heat dissipation fin,
53a. channel,
532. heat dissipation fin,
54. centrifugal fan,
542. flow guide plate,
55. axial fan,
56. axial fan,
562. fan blade,
62. swivel bearing.

DETAILED DESCRIPTION OF EMBODIMENTS

Features and exemplary embodiments according to various aspects of the present application are described hereinafter in detail. In the following detailed description, numerous specific details are set forth in order to provide a thorough understanding of the present application. However, it is apparent to the person skilled in the art that the present application may be embodied without requiring some of these specific details. The following description of the embodiments is only for providing a better understanding of the present application by showing examples of the present application. In the drawings and the following description, at least part of well-known structures and well-known technologies are not shown, so as to avoid unnecessarily obscuring the present application, and for clarity, the thickness of a region and the thickness of a layer may be exaggerated. In the drawings, the same reference numerals indicate the same or similar structures, thus detailed description thereof will be omitted. In addition, features, structures or characteristic described hereinafter may be integrated in one or more embodiments in any suitable manner.

Nouns of locality presenting in the following description are all directions shown in the drawings and not limitations to a specific structure of a motor rotor holder according to the present application. In the description of the present application, it is further to be noted that, unless explicitly specified and defined, terms "installed", "connected to" and "connected" should be interpreted in a broad sense, for example, "connected" may refer to "fixedly connected", and may alternatively refer to "detachably connected" or "integrally connected", and may alternatively refer to "mechanically connected" or "electrically connection", and may alternatively refer to "directly connected" or "indirectly connected through an intermediate medium". For the person skilled in the art, specific meanings of the above terms in the present application may be interpreted depending on specific situations.

A motor rotor holder according to an embodiment of the present application may be installed in a motor having an inner rotor and an outer stator. A primary cooling medium circulation circuit and a secondary cooling medium circulation circuit is constructed for the motor and heat exchange between a primary cooling medium and a secondary cooling medium is achieved in the motor, thus a heat generation component in the motor is cooled effectively. In the following embodiment of the present application, by way of example, the motor rotor holder is applied to a motor in which a concentrated winding is used and which is permanently magnetically excited, however, the type of a motor to which the motor rotor holder according to the embodiment of the present application may be applied is not limited to this. In other embodiments, the motor rotor holder may alternatively be applied in a motor having a winding in other forms and being excited in other manners, for example, the motor rotor holder may alternatively be applied in a motor with a distributed winding or applied in a doubly-fed motor.

For a better understanding of the present application, the motor rotor holder according to the embodiment of the present application is described hereinafter in detail in conjunction with FIGS. 1 to 5.

Figure 1:
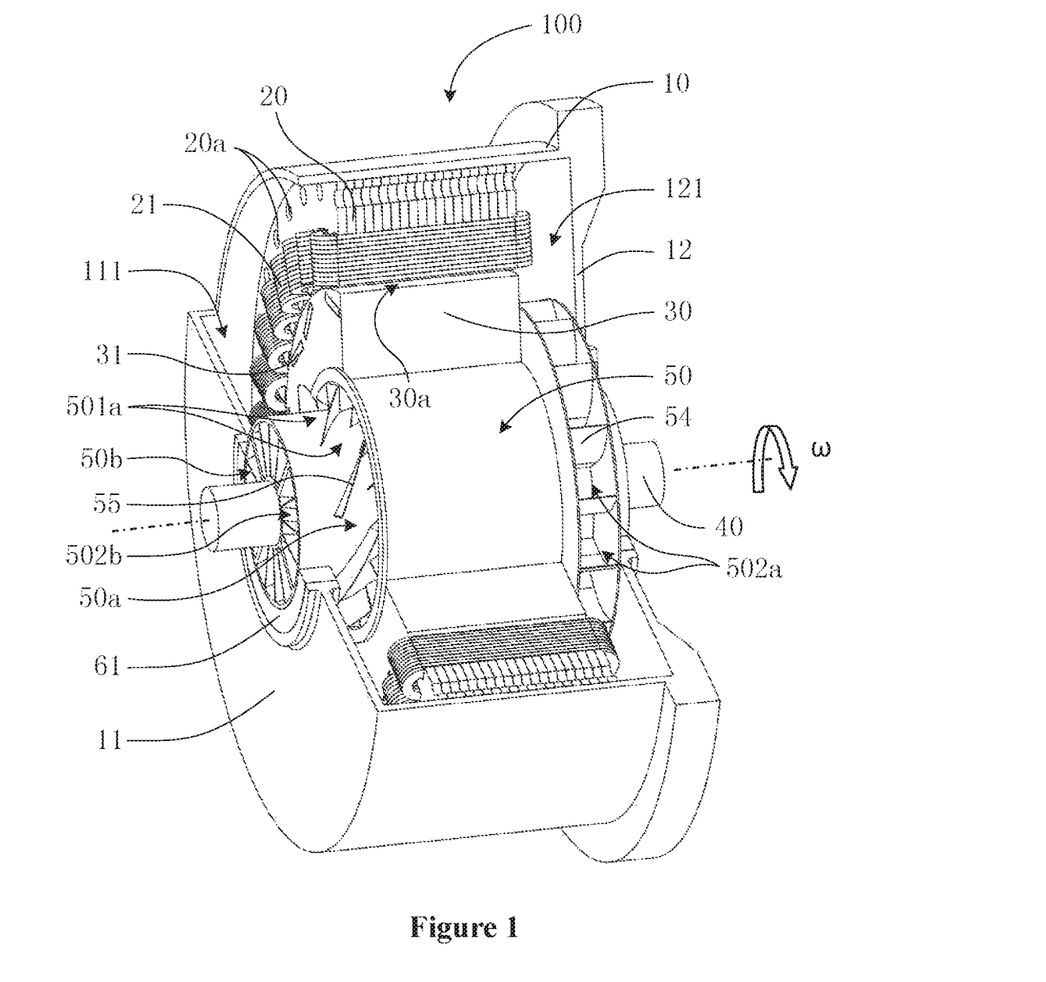
FIG. 1 is a partially cutaway schematic shoving the structure of a motor in one axonometric direction according to an embodiment of the present application.
Figure 2:
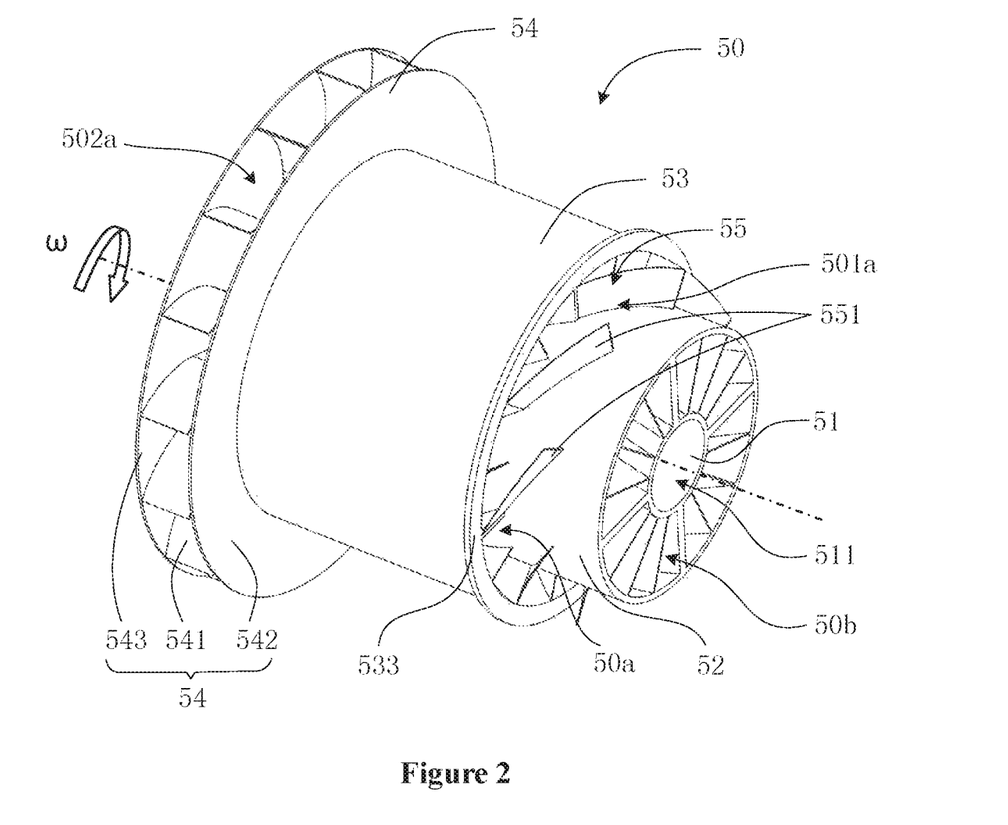
FIG. 2 is a schematic perspective view showing the structure of a motor rotor holder according to an embodiment of the present application.

FIG. 1 is a partially cutaway schematic view showing the structure of a motor 100 in one axonometric direction according to an embodiment of the present application. FIG. 1 shows an internal structure of a housing 10 of the motor 100 with a part being cut away. As shown in FIG. 1, the motor 100 has a stator 20, a rotor 30, a rotating shaft 40 and a motor rotor holder 50. Reference is made to FIG. 2, which is a schematic perspective view showing the structure of the motor rotor holder 50 of the motor 100 shown in FIG. 1 in one axonometric direction. As shown in FIG. 1 and FIG. 2, in this embodiment, the motor rotor holder 50 is rotationally supported in the housing 10 of the motor 100, and the motor rotor holder 50 includes a first cooling channel 50a and a second cooling channel 50b. The first cooling channel 50a allows two interior spaces at two axial sides of the rotor 30 in the housing 10 to be in communication with each other, so as to direct a first cooling medium through the first cooling channel 50a. The second cooling channel 50b is in communication with an exterior of the housing 10, so as to direct a second cooling medium through the second cooling channel 50b. The first cooling channel 50a and the second cooling channel 50b are provided to have a common heat conduction portion, and the first cooling medium is allowed to exchange heat with the second cooling medium via the common heat conduction portion, thus heat absorbed by the first cooling medium is transferred from an interior of the housing 10 and is discharged to the exterior of the housing 10. In the following embodiment of the present application, exemplary description is made by taking air in the housing of the motor 100 (the air in the housing of the motor 100 may also be referred to as a primary cooling medium in this embodiment) as the first cooling medium and taking air outside the housing of the motor 100 (the air outside the housing of the motor 100 may also be referred to as a secondary cooling medium in this embodiment) as the second cooling medium. Of course, in other embodiments, the first cooling medium and the second cooling medium may alternatively be provided as other gaseous cooling media depending on cooling requirements.

Hereby, when the motor 100 is operated, the first cooling medium in the housing 10 may continuously absorb heat from a heat generation component in the housing 10 and pass through the first cooling channel 50a to allow a closed-loop cooling circuit to be formed, while the second cooling medium outside the housing 10 may continuously pass through the second cooling channel 50b to allow an open-loop cooling circuit to be formed. Therefore, the second cooling channel 50b may cool the first cooling medium through the second cooling medium outside the housing 100 and circulating in the second cooling channel 50b via the common heat conduction portion, in which the first cooling medium circulates in the first cooling channel 50a and is in a completely sealed state and has absorbed heat from the heat generation component in the housing 10, and the second cooling channel 50b may finally transfer the heat in the housing 10 to the exterior of the housing 10. The motor rotor holder 50 is integrated with a function of supporting the rotor 30 and limiting the position of the rotor 30, a function of driving the cooling media to circulate, and a function of a cooler in which heat exchange is carried out between the first cooling medium and the second cooling medium, which improves cooling effect on the heat generation component of the motor 100 while simplifying the structure of an overall system of the entire motor 100.

Specifically, the housing 10 encloses the stator 20, the rotor 30, the rotating shaft 40 and the motor rotor holder 50. Due to the limiting of the housing 10, a cavity 111 and a cavity 121 are respectively formed at two sides of each of the stator 20 and the rotor 30. The stator 20 is formed by multiple stator iron core laminations laminated axially, and the stator 20 is fixedly connected to the housing 10 circumferentially, and is in a static state. A stator winding 21 is wound around the stator 20 through teeth portions of the stator 20. The rotor 30 is circumferentially embedded with multiple pairs of magnetic steels 31 corresponding to the stator 20, and an annular air gap 30a is formed circumferentially between the rotor 30 and the stator 20. The rotor 30 is indirectly sleeve-coupled to an outside of the rotating shaft 40 through the motor rotor holder 50, such that the rotor 30 may be rotated synchronously together with the rotating shaft 40.

As shown in FIG. 2, the motor rotor holder 50 includes three cylinders with different diameters and circular cross-sections, that is, an inner cylinder 51, an intermediate cylinder 52 and an outer cylinder 53. The inner cylinder 51, the intermediate 52 and the outer cylinder 53 are coaxially and radially arranged apart from one another in an order from in to outside, such that an internal hollow structure defined by the inner cylinder 51 forms a central axial hole 511, and an annular space defined between the intermediate cylinder 52 and the outer cylinder 53 forms the first cooling channel 50a while an annular space defined between the intermediate cylinder 52 and the inner cylinder 51 forms the second cooling channel 50b. Therefore, both the first cooling channel 50a and the second cooling channel 50b are annular channels, which are used for circulating the first cooling medium and the second cooling medium respectively, and the first cooling channel 50a surrounds the second cooling channel 50b, thus a good thermal bridging between the first cooling medium and the second cooling medium is established through the intermediate cylinder 52. The motor rotor holder 50 is made of a metallic material with a good heat conductivity and a good supporting performance. According to an embodiment of the present application, the motor rotor holder 50 is preferably made of an aluminum alloy material. Since the aluminum alloy material has a high strength which allows the motor rotor holder 50 to have enough strength, a strong supporting and positioning action may be provided between the rotor 30 and the rotating shaft 40. The aluminum alloy material further has a large heat conduction coefficient, thus thermal resistance of convective heat exchange between the first cooling medium and the second cooling medium may be reduced effectively. Further, an aluminum alloy has a small density, which can reduce an overall weight of the motor.

Figure 3:
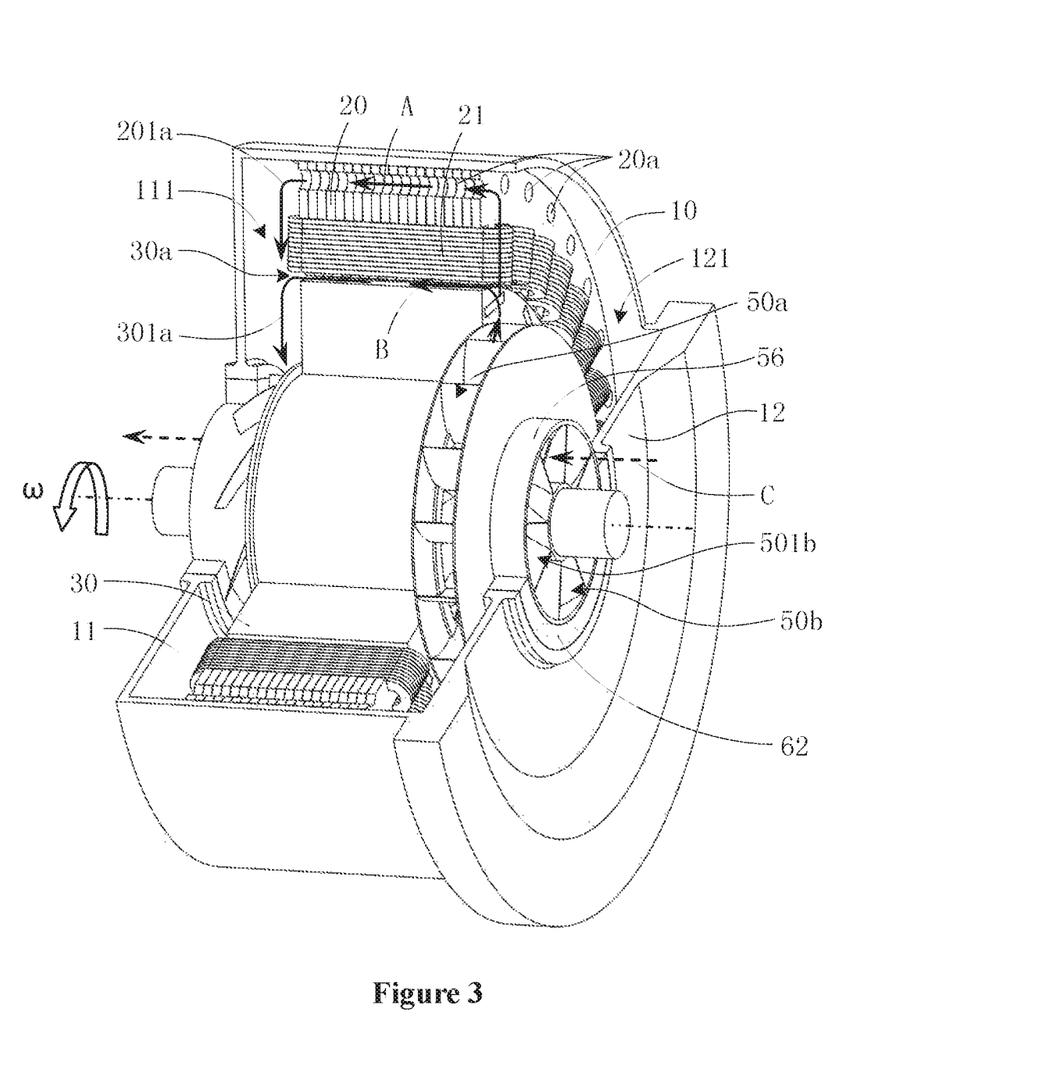
FIG. 3 is a partially cutaway schematic view showing the structure of the motor shown in FIG. 1 in another axonotnetric direction.

Reference is made to FIG. 3 which is a partially cutaway schematic view showing the structure of the motor 100 shown in FIG. 1 in another axonometric direction. As shown in FIG. 1 and FIG. 3, in the case that the motor rotor holder 50 is mounted in the motor 100, the motor rotor holder 50 is sleeve-coupled to an outside the rotating shaft 40 through the central axial hole 511, and the rotating shaft 40 is fastened to the central axial hole 511 without any relative rotation for example by interference fit or key connection and so on. The motor rotor holder 50 is further sleeve-coupled to an inside of the rotor 30 through the outer cylinder 53. The outer cylinder 53 may also be fastened to the rotor 30 without any relative rotation in a fitting manner same with the fitting manner between the central axial hole 511 and the rotating shaft 40. Outer peripheral walls at two ends of the intermediate cylinder 52 are respectively connected to a housing side wall 11 and a housing side wall 12 of the housing 10 through a swivel bearing 61 and a swivel bearing 62, thus a rotational support and sealing of the housing 10 is achieved by means of the swivel bearing 61 and the swivel bearing 62. Further by the intermediate cylinder 52 and the housing 10, the first cooling channel 50a may be defined in the housing 10 and the second cooling channel 50b may be defined outside the housing 10. Since the first cooling channel 50b in the housing 10 of the motor 100 is almost isolated from outside air and there is no need providing a cooling medium by direct communication with an external device, the motor rotor holder 50 may ensure the motor 100 to have a higher IP INGRESS PROTECTION) level while providing efficient cooling for the heat generation component in the housing 10.

After the motor rotor holder 50 is mounted in the motor 10, two axial ends of the first cooling channel 50a form a first cooling medium inlet 501a and a first cooling medium outlet 502a respectively. Through the first cooling medium inlet 501a and the first cooling medium outlet 502a respectively, the first cooling channel 50a is allowed to be in communication with the spaces at the two axial sides of the rotor 30 in the housing 10, that is, in communication with the cavity 111 and the cavity 121. Therefore, the first cooling medium in the housing 10 is allowed to pass through the first cooling channel 50a via the first cooling medium inlet 501a and the first cooling medium outlet 502, thereby the first cooling channel 50a provides a basis for forming a primary cooling medium circulation circuit of the motor 100.

Two axial ends of the second cooling channel 50b respectively form a second cooling medium inlet 501b and a second cooling medium outlet 502b. The second cooling channel 50b is allowed to be in communication with the exterior of the housing 10 through the second cooling medium outlet 501b and the second cooling medium outlet 502b respectively. The second cooling medium outside the housing 10 is allowed to pass through the second cooling channel 50b via the second cooling medium inlet 501b and the second cooling medium outlet 502b, thus a secondary cooling medium circulation circuit of the motor 100 is formed.

Further, in an embodiment of the present application, diameters and cylinder wall thicknesses of the inner cylinder 51, the intermediate cylinder 52 and the outer cylinder 53 are not limited, as long as the motor rotor holder 52 is allowed to be mounted between the rotor 30 and the rotating shaft 40 of the motor 100 to be cooled and the motor rotor holder 52 has two cooling channels satisfying requirements of cooling the motor 100. Thus, for the motor 100, the diameters and the cylinder wall thicknesses of the inner cylinder 51, the intermediate cylinder 52 and the outer cylinder 53 may be selected appropriately depending on an inherent space between the rotor 30 and the rotating shaft 40 of the motor 100 and a heat generation amount of the heat generation component of the motor 100.

In the above embodiment, the inner cylinder 51, the intermediate cylinder 52 and the outer cylinder 53 are three cylinder structures with circular cross-sections, however, the embodiment of the present application is not limited to this. In other embodiments, the inner cylinder 51, the intermediate cylinder 52 and the outer cylinder 53 may alternatively be cylinder structures with non-circular cross-sections, for example, the inner cylinder 51, the intermediate cylinder 52 and the outer cylinder 53 may alternatively be cylinder structures with oval cross-sections or regular polygonal cross-sections. Of course, in the case that the inner cylinder 51, the intermediate cylinder 52 and the outer cylinder 53 are cylinder structures with non-circular cross-sections, in order to correspond to the rotating shaft 40, it is required to correspondingly provide a connection structure, which allows the central axial hole 511 to be fastened to the rotating shaft 40 in the inner cylinder 51, and it is required to correspondingly provide a connection structure, which allows the outer cylinder 53 to be fastened to the rotor 30 outside the outer cylinder 53, such that the inner cylinder 51, the intermediate cylinder 52 and the outer cylinder 53 are allowed to be coaxially sleeve-coupled to an outside of the rotating shaft 40. Thus, the rotor 30 and the motor rotor holder 50 are allowed to rotate synchronously along with the rotating shaft 40.

In addition, the motor rotor holder 50 is not limited to being formed by three cylinder structures with different diameters. In other embodiments, the motor rotor holder 50 may alternatively be any other support structure in which two cooling channels may be formed and which may support the rotor 30. For example, the motor rotor holder 50 may further be an integrated structure, and the motor rotor holder 50 is a stepped cylindrical structure as a whole. By circumferentially providing inner axial through-holes and outer axial through-holes through the cylindrical structure, multiple outer axial through-holes distributed circumferentially are thus allowed to form the first cooling channel 50a while multiple inner axial through-holes distributed circumferentially are allowed to form the second cooling channel 50b. Hereby, it is also possible to achieve that, the first cooling medium in the cavity 111 and the cavity 112 located in the housing 10 is allowed to continuously flow through the heat generation component in the motor 10, and absorbs heat from the heat generation component and is then directed into the second cooling channel 50b to allow a closed-loop cooling circuit to be formed, and that the second cooling medium outside the housing 10 is continuously directed into the second cooling channel 50b to allow an open-loop cooling circuit to be formed. The thermal bridging between the first cooling medium and the second cooling medium may further be established through a common wall surface (that is, a holder body structure between the multiple outer axial through-holes and the multiple inner axial through-holes) which is provided to separate the first cooling channel 50a from the second cooling channel 50b, thereby effective cooling of the first cooling medium in a sealed state is achieved by the second cooling medium.

In order to allow the first cooling medium in the housing 10 to be continuously directed into the first cooling channel 50a, a first cooling fan is provided at an opening at any one side of the first cooling channel 50a of the motor rotor holder 50 or at each of openings at two sides of the first cooling channel 50a. The first cooling fan may be a centrifugal fan, an axial fan or any other suitable fan. By way of example, in this embodiment, a centrifugal fan 54 is provided at the first cooling medium outlet 502a of the first cooling channel 50a, while an axial fan 55 is optionally provided at the first cooling medium inlet 501a.

The centrifugal fan 54 (as shown in FIG. 2) includes one or more centrifugal fan blades 541 (a case where multiple fan blades 541 are provided is shown in the figure) and a flow guide plate 542 and a flow guide plate 543, and the flow guide plate 542 and the flow guide plate 543 are located at two sides of each of the fan blades 541, and the flow guide plate 542 and the flow guide plate 543 are arranged in parallel to each other. The flow guide plate 542 is joined to an edge, at a side, of the outer cylinder 53, and the flow guide plate 543 is connected to an outer peripheral wall of the intermediate cylinder 52, which allows an air outlet (that is, multiple opening portions defined by the flow guide plate 542 and the flow guide plate 543) of the centrifugal fan 541 to serve as the first cooling medium outlet 502a. In the case that the axial fan 55 is provided, the axial fan 55 (as shown in FIG. 2) includes one or more axial fan blades 551 (a case where multiple axial fan blades 551 are provided is shown in the figure) provided at the outer peripheral wall of the intermediate cylinder 52, which allows an air inlet (that is, multiple opening portions defined between the multiple axial fan blades 551) of the axial fan 55 to serve as the first cooling medium inlet 501a of the first cooling channel 50a.

Therefore, the first cooling channel 50a is in communication with the air gap 30a via the cavity 111 and the cavity 121, which allows a first circulation circuit 301a (as shown by a solid arrow B in FIG. 3) in which the first cooling medium circulates to be formed. That is, when the motor rotor holder 50 is rotated, a negative pressure may be generated locally by synchronous follow-up of the centrifugal fan 54, thereby providing necessary drive force for circulation of the first cooling medium in the housing 10. Driven by the centrifugal fan 54, the first cooling medium at a side of the cavity 121 is allowed to flow from the first cooling medium inlet 501a into the first cooling channel 50a via the air gap 30a and the cavity 111 and then to helically flow into the centrifugal fan 54 axially, and finally to be discharged radially by the centrifugal fan 54 from the first cooling medium outlet 502a to the side of the cavity 121.

Further, since one or more channels 20a (multiple channels 20a are shown by way of example in the figure) are provided at the stator 20 in an axial direction of the stator 20, the first cooling channel 50a is in communication with the multiple channels 20a via the cavity 111 and the cavity 121, which allows a second circulation circuit 201a (as shown by a solid arrow A in FIG. 3) in which the first cooling medium circulates to be formed. That is, when the motor rotor holder 50 is rotated, the first cooling medium at the side of the cavity 121 is driven by the centrifugal fan 54 to flow from the first cooling medium inlet 501a into the first cooling channel 50a via the channels 20a and the cavity 111 and to axially flow into the centrifugal fan 54. Finally, the first cooling medium is radially discharged by the centrifugal fan 54 from the first cooling medium outlet 502a to the side of the cavity 121.

By synchronous rotation of the axial fan 55 along with the rotating shaft 40, a flow direction of the first cooling medium in the housing 10 is forced to be consistent with a flow direction of the first cooling medium driven by the centrifugal fan 54. The axial fan 55 may be considered as a secondary driver for circulating the first cooling medium in the housing 10, and power for circulating the first cooling medium may be further increased, thereby increasing a flow speed of the first cooling medium and achieving better effect of heat exchange. Therefore, the first cooling medium in the housing 10 is driven by the centrifugal fan 54 and the axial fan 55 to pass through the first cooling channel 50a, thus two primary cooling medium circulation circuit branches are formed, thereby cooling the heat generation component in the motor 100.

Since the centrifugal fan 54 and the axial fan 55 are fixedly connected to the intermediate cylinder 52 and the outer cylinder 53, the centrifugal fan 54 and the axial fan 55 may be driven by the rotating shaft 40 to rotate, which forms a non-independent circulation circuit component. Of course, the centrifugal fan 54 and the axial fan 55 may alternatively be provided to be detachably connected to an outer wall of the intermediate cylinder 53. In order to axially position the installed rotor 30, a detachable stop flange 533 is further provided at an edge on a side of an outer peripheral wall of the outer cylinder 53. The rotor 30 is mounted between the centrifugal fan 54 and the stop flange 533, thus, the rotor 30 may be axially positioned, and relative movement of the rotor 30 with respect to the motor rotor holder 50 during rotation is prevented. Further, in the case that two axial fans 55 are provided at the openings at the two sides of the first cooling channel 50a, an action of directing the first cooling medium into the first cooling channel 50a may be also achieved.

Figure 4:
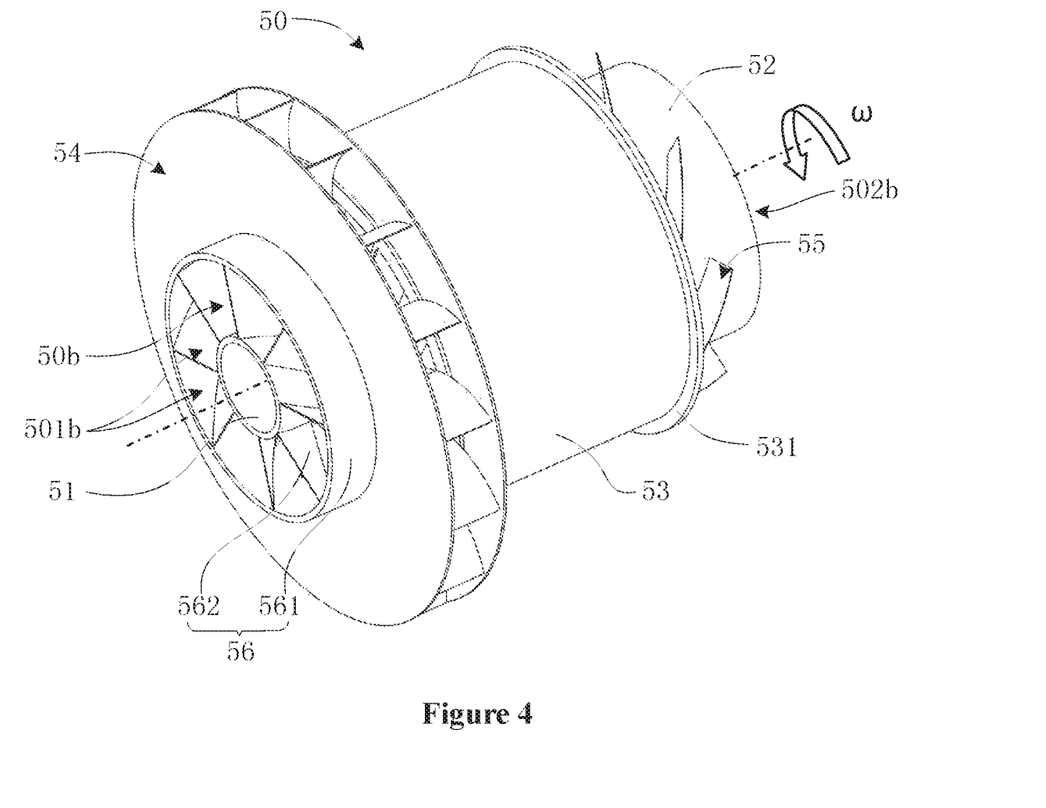
FIG. 4 is a schematic view showing the structure of the motor rotor holder of the motor shown in FIG. 2 in another axonometric direction.

In order to allow the second cooling medium outside the housing 10 to be continuously directed into the second cooling channel 50b, a second cooling fan is provided at an opening at any one side of the second cooling channel 50b of the motor rotor holder 50 or at each of openings at two sides of the second cooling channel 50b. By way of example, in this embodiment, an axial fan 56 is provided at the second cooling medium inlet 501b of the second cooling channel 50b. Reference is made to FIG. 4, which is a view showing the structure of the motor rotor holder 50 shown in FIG. 2 in another axonometric direction. As shown in FIG. 4, the axial fan 56 includes a fan casing 561 and one or more fan blades 562 (a case where multiple fan blades 562 are provided is shown in the figure). The fan blades 562 are connected to an outer wall of the inner cylinder 51, while the fan casing 561 has the same outer diameter as that of the intermediate cylinder 52 (the fan casing 561 may alternatively be integrally formed with the intermediate cylinder 52). Of course, the fan casing 561 may not be provided, and only one or more fan blades 562 are provided at the outer wall of the inner cylinder 51. In this case, an air inlet (that is, multiple opening portions defined and formed between the fan casing 561 and the fan blades 562) of the axial fan 56 is just the second cooling medium inlet 501b of the second cooling channel 50b, and an axial opening, at an end opposite to a position where the axial fan 56 is mounted, of the second cooling channel 50b is the second cooling medium outlet 502b of the second cooling channel 50b. Thus, a channel in which the second cooling medium circulates is formed. In the structure of the axial fan 56 described above, there is no redundancy in the appearance and the structure of the motor rotor holder 50, thereby simplifying the structure of the motor rotor holder 50. Of course, the axial fan 56 may alternatively be connected to the inner cylinder 51 in a detachable connection manner. Since the axial fan 56 is fixedly connected to an outer peripheral wall of the inner cylinder 51, the axial fan 56 may be driven by the rotating shaft 40 to rotate, which also forms a non-independent circulation circuit component.

Compared with the conventional technology, by constructing two non-independent circulation circuit components, the motor rotor holder 50 may allow a complex independent circulation circuit component, a complex pipeline and a separately-installed cooler in a secondary cooling medium circulation circuit to be eliminated in a cooling system of the motor 100, thereby simplifying the structure of an entire motor system and making the structure of the motor system more compact.

Therefore, when the motor 100 is operated, the second cooling medium at one side of the housing 10 may be driven by the axial fan 56 to flow from the second cooling medium inlet 501b into the second cooling channel 50b and to be discharged from the second cooling medium outlet 502b to another side of the housing 10, as shown by a dotted line C in FIG. 3. The second cooling medium outside the housing 10 is driven by the axial fan 56 to pass through the second cooling channel 50b to allow the secondary cooling medium circulation circuit to be formed, and the second cooling medium outside the housing 10 is caused to exchange heat with the first cooling medium in the first cooling channel 50a.

In the case that two axial fans 56 are provided at the openings at the two sides of the second cooling channel 50b, a directing action of directing the second cooling medium to circulate in the second cooling channel 50b may be further enhanced, and a flow speed of the second cooling medium in the second cooling channel 50b may be increased, thus heat exchange efficiency of the second cooling medium exchanging heat with the first cooling medium in the first cooling channel 50a can be further improved. Of course, in the case that the second cooling fan is a centrifugal fan, in order to facilitate discharging the cooling medium from an opening of the centrifugal fan, the second cooling fan is required to be provided at an axial end at a side of the second cooling channel 50b, that is, be connected to an axial end at a side of the intermediate cylinder 52 and located at an outer side of the swivel bearing 61 or the swivel bearing 62. Hereby, it is also possible to continuously direct the second cooling medium outside the housing 10 into the second cooling channel 50b. Of course, referring to the first cooling medium channel 50a, a centrifugal fan may alternatively be provided at an opening at one side of the second cooling medium channel 50b, and an axial fan provided at an opening at another side of the second cooling medium channel 50b.

In an optional embodiment, the first cooling fan at the first cooling channel 50a and the second cooling fan at the second cooling channel 50b direct the first cooling medium and the second cooling medium to flow in opposite directions. Of course, arrangement of the cooling fans is further required to consider a rotation direction of the motor. That is, a circulation direction of the first cooling medium in the housing 10 being driven by the centrifugal fan 54 and the axial fan 55 to circulate in the first cooling channel 50a is opposite to a circulation direction of the second cooling medium outside the housing 10 being driven by the axial fan 56 to circulate in the second cooling channel 50b, thus the first cooling medium and the second cooling medium are allowed to flow through two sides of the intermediate cylinder 52 of the motor rotor holder 50 in the form of flows in opposite directions, thereby effectively improving the heat exchange efficiency between the first cooling medium and the second cooling medium.

Of course, irrespectively of the structure of the motor rotor holder 50, for an mounting manner of installing each of the centrifugal fan 54, the axial fan 55 and the axial fan 56 at the motor rotor holder 50, reference may be made to the mounting manner in the embodiment described above. For achieving an object of the present application, according to a preset circulation direction of the cooling medium in each of the first cooling channel 50a and the second cooling channel 50b, the centrifugal fan 54, the axial fan 55 and the axial fan 56 are correspondingly provided at cooling medium inlets and cooling medium outlets of the first cooling channel 50a and the second cooling channel 50b.

Figure 5:
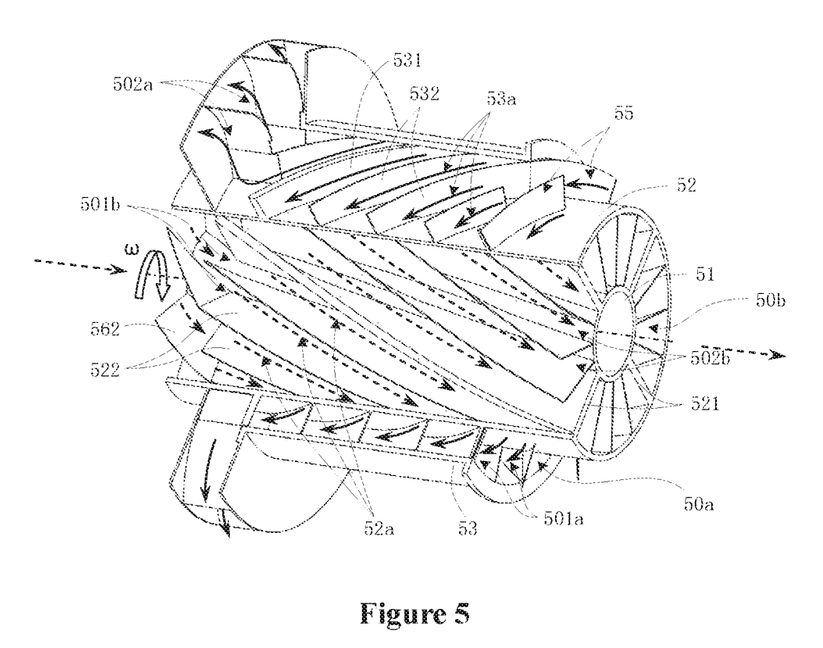
FIG. 5 is a partially cutaway schematic view showing the structure of a motor rotor holder according to an embodiment of the present application.

FIG. 5 is a partially cutaway schematic view showing the structure of the motor rotor holder 50 according to an embodiment of the present application. As shown in FIG. 5, in order to allow the inner cylinder 51, the intermediate cylinder 52 and the outer cylinder 53 to be separately provided and maintain a certain distance apart from one another radially, the intermediate cylinder 52 is separately arranged from the inner cylinder 51 and the outer cylinder 53 through support components respectively. Specifically, one or more support stiffening plates 521 (a case where multiple support stiffening plates 521 are provided is shown by way of example in the figure) and one or more support stiffening plates 531 (a case where multiple support stiffening plates 531 are provided is shown by way of example in the figure) are respectively provided in the first cooling channel 50a and the second cooling channel 50b in a circumferential direction of the motor rotor holder 50. According to an embodiment of the present application, specifically, two side end surfaces of each of the multiple support stiffening plates 531 in a radial direction thereof are connected to the outer peripheral wall of the intermediate cylinder 52 and an inner peripheral wall of the outer cylinder 53 respectively, thus, the annular first cooling channel 50a is circumferentially partitioned into multiple axially-extending circulation spaces. Similarly, two side end surfaces of each of the multiple support stiffening plates 521 in a radial direction thereof are connected to the outer peripheral wall of the inner cylinder 51 and the inner peripheral wall of the intermediate cylinder 52 respectively, thus, the annular second cooling channel 50b is circumferentially partitioned into multiple axially-extending circulation spaces. Preferably, the support stiffening plates 521 and the support stiffening plates 531 are circumferentially arranged evenly at equal angles in the second cooling channel 50b) and the first cooling channel 50a respectively, thereby achieving better effect of heat exchange. Depending on requirements for a support force between the rotor 30 and the rotating shaft 40, the number of the support stiffening plates 521 and the number of the support stiffening plates 531 may be selected for providing sufficient strength for the motor rotor holder 50, so as to support the rotor 30 and the rotating shaft 40 and limit the position of the rotor 30 and the position of the rotating shaft 40 during the synchronous rotation. Of course, the support components may alternatively not be in the form of the above support stiffening plates, and in other embodiments, the support components may alternatively be one or more support pillars or one or more support blocks.

According to an embodiment of the present application, in order to increase a heat exchange area of the first cooling medium and a heat exchange area of the second cooling medium while further helping the first cooling medium and the second cooling medium to flow in a respective cooling channel where the first cooling medium or the second cooling medium is located, one or more heat dissipation fins are provided in at least one of the first cooling channel 50a and the second cooling channel 50b. That is, one or more heat dissipation fins 522 and 532 (a case where multiple heat dissipation fins 522 and 532 are provided is shown in the figure) are provided in at least one of the first cooling channel 50a and the second cooling channel 50b. According to an embodiment of the present application, specifically, at least one of the multiple heat dissipation fins 532 is helical (a case where each of the multiple heat dissipation fins 532 is helical is shown in the figure), and the multiple heat dissipation fins 532 are provided in parallel in a circumferential direction of the first cooling channel 50a. Two radial side end surfaces of each of the heat dissipation fins 532 are respectively connected to the outer peripheral wall of the intermediate cylinder 52 and the inner peripheral wall of the outer cylinder 53, and the heat dissipation fins 532 are arranged to helically extend in the first cooling channel 50a in an axial direction of the motor rotor holder 50. Therefore, the first cooling channel 50a is formed into multiple channels 53a, such that the first cooling medium entering the first cooling channel 50a flows in a direction indicated by multiple solid arrows in the figure. In this embodiment, in order to prevent interference between structures in the first cooling channel 50a, the multiple support stiffening plates 531, corresponding to the heat dissipation fins 532, are provided as helical structures having the same curvatures as those of the heat dissipation fins 532. The multiple heat dissipation fins 532 are respectively provided evenly in circulation spaces defined and formed by the multiple support stiffening plates 531, such that the multiple support stiffening plates 531 together with the multiple heat dissipation fins 532 may partition the first cooling channel 50a into the multiple parallel channels 53a. Therefore, the stiffness of an overall structure of the motor 100 may be improved while increasing the heat exchange area of the first cooling medium, and anti-tremor performance of the motor 100 is further improved. Of course, in the case that each of the multiple heat dissipation fins 532 has a sufficient thickness and the two radial side end surfaces of each of the multiple heat dissipation fins 532 are respectively connected to the outer peripheral wall of the intermediate cylinder 52 and the inner peripheral wall of the outer cylinder 53, the support stiffening plates 531 may be omitted, and a support action of supporting the intermediate cylinder 52 and the outer cylinder 53 is achieved by the multiple heat dissipation fins 532.

Similarly, at least one of the multiple heat dissipation fins 522 is helical (a case where each of the multiple heat dissipation fins 522 is helical is shown in the figure), and the multiple heat dissipation fins 522 are provided in parallel in a circumferential direction of the second cooling channel 50b. Two radial end surfaces of each of the heat dissipation fins 522 are respectively connected to the outer peripheral wall of the inner cylinder 51 and an inner peripheral wall of the intermediate cylinder 52, and the heat dissipation fins 522 are configured to extend helically in the second cooling channel 50b in the axial direction of the motor rotor holder 50. Therefore, the second cooling channel 50b is formed into multiple channels 52a, such that the second cooling medium entering the second cooling channel 50b may flow in a direction as indicated by multiple dotted arrows in the figure. In this embodiment, in order to prevent interference between structures in the second cooling channel 50b, the multiple support stiffening plates 521, corresponding to the heat dissipation fins 522, are provided as helical structures having the same curvatures as those of the heat dissipation fins 522. The multiple heat dissipation fins 522 are respectively arranged evenly in circulation spaces defined and formed by the multiple support stiffening plates 521, such that the multiple support stiffening plates 521 together with the multiple heat dissipation fins 522 may partition the second cooling channel 50b into the multiple parallel channels 52a. Therefore, the stiffness of the overall structure of the motor 100 may be improved while increasing the heat exchange area of the second cooling medium, and the anti-tremor performance of the motor 100 is further improved. Of course, in the case that each of the multiple heat dissipation fins 522 has a sufficient thickness and the two radial side end surfaces of each of the multiple heat dissipation fins 522 are respectively connected to the outer peripheral wall of the inner cylinder 51 and the inner peripheral wall of the intermediate cylinder 52, the support stiffening plates 521 may be omitted, and a support action of supporting the inner cylinder 51 and the intermediate cylinder 52 is achieved by the multiple heat dissipation tins 532.

According to an embodiment of the present application, as shown in FIG. 5, in order to improve the heat exchange efficiency between the first cooling medium and the second cooling medium, a direction in which the heat dissipation fins 522 and the heat dissipation fins 532 are arranged helically may be set as follows according to a circulation direction in which the first cooling medium is driven by the cooling fan to circulate in the first cooling channel 50a and a circulation direction in which the second cooling medium is driven by the cooling fan to circulate in the second cooling channel 50b.

In the case that the circulation direction of the first cooling medium in the first cooling channel 50a is the same as the circulation direction of the second cooling medium in the second cooling channel 50b, a direction in which the multiple heat dissipation fins 532 in the first cooling channel 50a are arranged helically in the circulation direction of the first cooling medium is the same as a direction in which the multiple heat dissipation fins 522 in the second cooling channel 50b are arranged helically in the circulation direction of the second cooling medium. By way of example, from a viewpoint of an observer, the circulation direction of the first cooling medium is set to be a right-to-left circulation direction shown in FIG. 5, and the circulation direction of the second cooling medium is also set to be a right-to-left circulation direction. In this case, a direction in which the multiple heat dissipation fins 532 are arranged helically in an axial direction of the first cooling channel 50a may be set to be viewed from right to left, and the multiple heat dissipation fins 532 are arranged around the intermediate cylinder 52 in an anticlockwise direction. A direction in which the multiple heat dissipation fins 522 are arranged helically in an axial direction of the second cooling channel 50b is set to be viewed from right to left, and the multiple heat dissipation fins 522 are arranged around the inner cylinder 51 in the anticlockwise direction.

In the case that the circulation direction of the first cooling medium in the first cooling channel 50a is opposite to the circulation direction of the second cooling medium in the second cooling channel 50b, the direction in which the multiple heat dissipation fins 532 in the first cooling channel 50a are arranged helically in the circulation direction of the first cooling medium is opposite to the direction in which the multiple heat dissipation fins 522 in the second cooling channel 50b are arranged helically in the circulation direction of the second cooling medium. By way of example, as shown in FIG. 5, from the viewpoint of the observer, the circulation direction of the first cooling medium is set to be a right-to-left circulation direction shown in the figure, and the circulation direction of the second cooling medium is set to be a right-to-left circulation direction shown in the figure. In this case, the direction in which the multiple heat dissipation fins 532 are arranged helically in the axial direction of the first cooling channel 50a may be viewed from right to left, and the multiple heat dissipation fins 532 may be arranged around the intermediate cylinder 52 in the anticlockwise direction. The direction in which the multiple heat dissipation fins 522 are arranged helically in the axial direction of the second cooling channel 50b is set to be viewed from left to right, and the multiple heat dissipation fins 522 are arranged around the inner cylinder 51 in a clockwise direction.

The heat dissipation fins 522 and the heat dissipation fins 532 are arranged as described above, thus better convective heat exchange may be carried out between the first cooling medium circulating in the first cooling channel 50a and the second cooling medium circulating in the second cooling channel 50b. The first cooling medium and the second cooling medium flow through the two sides of the intermediate cylinder 52 in the form of flows with a same direction or opposite directions, and the first cooling medium and the second cooling medium are further in sufficient contact for the heat exchange, which further improves the heat exchange efficiency between the first cooling medium and the second cooling medium.

By providing the heat dissipation fins 532 and the heat dissipation fins 522, the first cooling medium and the second cooling medium are allowed to helically flow in the first cooling channel 50a and the second cooling channel 50b respectively, which may increase the heat exchange area of the first cooling medium in the first cooling channel 50a and the heat exchange area of the second cooling medium in the second cooling channel 50b, respectively. Therefore, through the intermediate cylinder 52, good thermal bridging is established between the first cooling medium and the second cooling medium, thereby achieving a sufficient heat exchange between the first cooling medium and the second cooling medium. Thus, heat exchange efficiency between the primary cooling medium and the secondary cooling medium is improved, and further, the second cooling medium is allowed efficiently cool the first cooling medium which is in a completely sealed state and has absorbed waste heat from the heat generation component in the motor 100.

In the above embodiment, the multiple heat dissipation fins 522 and the multiple heat dissipation fins 532 are helical and respectively connected to the inner peripheral wall and the outer peripheral wall of the intermediate cylinder 52 in an evenly distributed manner, however, an embodiment of the present application is not limited to this. In other embodiments, the multiple heat dissipation fins 522 and the multiple heat dissipation fins 532 may alternatively not be arranged in the evenly distributed manner, and the multiple heat dissipation fins 522 may alternatively be provided to differ from one another in curvature and the multiple heat dissipation fins 532 may alternatively be provided to differ from one another in curvature. Moreover, in the embodiment of the present application, numbers and thicknesses of the heat dissipation fins 522 and the heat dissipation fins 532 are not limited and may be adaptively adjusted depending on volumes of the first cooling channel 50a and the second cooling channel 50b and the amount of heat generated by the heat generation component of the motor 100. Further, the heat dissipation fins 522 and the heat dissipation fins 532 may alternatively not be of a helical structure, for example, the heat dissipation fins 522 and the heat dissipation fins 532 may alternatively be provided to be at least partially straight-planar-shaped. Each heat dissipation fin 522 and each heat dissipation fin 532 may alternatively be formed by multiple fin structures axially provided in the form of sections. Of course, the multiple heat dissipation fins 522 may be constructed the same as the multiple heat dissipation fins 532 or different from the multiple heat dissipation fins 532.

Further, by way of example, the intermediate cylinder 52 and the outer cylinder 53 may alternatively be provided such that the heat dissipation fins 522 are provided at the inner peripheral wall of the intermediate cylinder 52 and the heat dissipation fins 532 are provided at the outer peripheral wall of the intermediate cylinder 52. Such arrangement may allow the convective heat exchange between the first cooling medium and the second cooling medium through the heat dissipation fins 522, the heat dissipation fins 532 and the intermediate cylinder 52, and thus the heat exchange efficiency between the first cooling medium and the second cooling medium is improved. In this case, through the heat dissipation fins 522, the heat dissipation fins 532, and the intermediate cylinder 52, the thermal bridge may be established between the first cooling medium and the second cooling medium.

Therefore, when the motor rotor holder 50 is rotated along with the rotating shaft 40, the first cooling medium and the second cooling medium are forced to respectively flow along the first cooling channel 50*a* and the second cooling channel 50*b* through the two sides of the intermediate cylinder 52 in the form of flows in opposite directions. In this case, better thermal bridging is provided for the first cooling medium and the second cooling medium by the heat dissipation fins 522, the heat dissipation fins 532, and the intermediate cylinder 52. After the first cooling medium is driven by the centrifugal fan 54 and the axial fan 55 to enter the first cooling channel 50*a*, the first cooling medium transfers the heat absorbed by the first cooling medium itself from the heat generation component of the motor 100 to the heat dissipation fins 532 in the first cooling channel 50*a* by convective heat exchange. This part of heat is transferred from the heat dissipation fins 532 to the heat dissipation fins 522 in the second cooling channel 50*b* via the intermediate cylinder 52 in a manner of heat conduction, and the heat is finally taken away by the second cooling medium flowing through the second cooling channel 50*b* in a manner of convective heat exchange and is discharged to the exterior of the housing 10. Therefore, the second cooling medium is allowed to efficiently cool the first cooling medium having absorbed the heat from the heat generation component in the motor 100.

Hereinafter, referring to FIG. 3, a process of heat exchange of the primary cooling medium (the first cooling medium) with the secondary cooling medium (the second cooling medium) of the motor 100 is described in detail. A primary cooling medium flow circulation circuit of the motor 100 is as shown by the solid arrows A and B in the figure. The primary cooling medium is driven by the centrifugal fan 54 and the axial fan 55 of the motor rotor holder 50 to circulate, and the primary cooling medium in the cavity 111 and the cavity 121 is driven by the centrifugal fan 54, thus two circulation circuits are formed.

The first cooling medium in a first circulation circuit 301*a* flows axially from the cavity 121 into the air gap 30*a*, and flows out of another end of the air gap 30*a* into the cavity 111. After the first cooling medium in the first circulation circuit 301*a* flows through the first cooling medium inlet 501*a* into the first cooling channel 50*a* of the motor rotor holder 50, the first cooling medium in the first circulation circuit 301*a* is finally also discharged by the centrifugal fan 54 through the first cooling medium outlet 502*a* into the cavity 121.

The first cooling medium in a second circulation circuit 201*a* flows through a side, where the stator winding 21 is located, of the cavity 121, and then enters into an axial channel 20*a* of the stator 20 and flows out along the channel 20*a* into the cavity 111 at another side. After the first cooling medium in the second circulation circuit 201*a* flows through another side of the stator winding 21, the first cooling medium in the second circulation circuit 201*a* flows through the first cooling medium inlet 501*a* into the first cooling channel 50*a* of the motor rotor holder 50, and is finally discharged again by the centrifugal fan 54 through the first cooling medium outlet 502*a* into the cavity 121.

A secondary cooling medium flow circulation circuit of the motor 100 is as shown by a solid arrow C in the figure. The second cooling medium is driven by the axial fan 56 to flow from one side of the exterior of the housing 10 into the second cooling channel 50*b* via the second cooling medium inlet 501*b*, and the second cooling medium is driven by the axial fan 56 to be discharged from another side of the second cooling channel 50*b* to another side of the exterior of the housing 10 via the second cooling medium outlet 502*b*.

When the first cooling medium flows, from the cavity 121, through and cools the heat generation component such as the stator 20, the stator winding 21 and the rotor 30 and then enters the first cooling channel 50*a*, the heat absorbed by the first cooling medium is taken away by the second cooling medium in the second cooling channel 50*b* by means of the heat dissipation fins 522 and the heat dissipation fins 532, and the heat dissipation fins 522 and the heat dissipation fins 532 are located at the two sides of the intermediate cylinder 52. Therefore, the first cooling medium is cooled, thus it is ensured that the first cooling medium can efficiently cool the heat generation component in the housing 100 continuously.

Hereby, by the motor rotor holder 50 according to the embodiment of the present application, a part of the secondary cooling medium circulation circuit and a part of the primary cooling medium circulation circuit of the motor are constructed, and thermal bridge between the primary cooling medium and the secondary cooling medium is established, and a non-independent circulation component is further equipped for each of the two cooling medium circulation circuits. The motor rotor holder 50 is integrated with a supporting and position limiting function, a cooling medium drive function and a function of a cooler in which heat exchange is carried out between the primary cooling medium and the secondary cooling medium. Helical arrangement of the support stiffening plates 521, 531 and the heat dissipation fins 522, 532 in the motor rotor holder 50 further improves the anti-tremor performance of the motor and increases the heat exchange areas of the cooling media, and further ensures stability of the structure of the motor 100 and cooling effect on the heat generation component of the motor 100.

In addition, due to close fit of the rotor 30 with the outer cylinder 53, during operation of the motor 100, the heat generated by the rotor 30 may further be directly transferred into the second cooling channel 50*b* by heat conduction of the motor rotor holder 50 (that is, transferred through the support stiffening plates 531 and the heat dissipation fins 521 to the intermediate cylinder 52 via the outer cylinder 53, and then transferred from the intermediate cylinder 52 to the support stiffening plates 521 and the heat dissipation fins 522), and then the heat generated by the rotor 30 is taken away by the second cooling medium in the manner of the convective heat exchange and is discharged to the exterior of the housing 10, thus, the cooling effect on the rotor 30 is further improved.

The present application may be embodied in other specific forms without departing from the spirit and essential characteristics thereof. The current embodiments are therefore to be considered in all respects as illustrative and not restrictive. The scope of the present application is defined by the appended claims rather than by the above description, and all changes falling within the meaning and range of equivalency of the claims are thus to be embraced within the scope of the present application. Different technical features present in different embodiments may be combined to obtain beneficial effects. Other variations to the disclosed embodiments may be understood and effected by the person skilled in the art upon studying the drawings, the specification, and the claims.

The invention claimed is:

1. A motor rotor holder rotatably supported in a housing of a motor, comprising:
   a first cooling channel which allows interior spaces at two axial sides of a rotor in the housing to be in communication with each other for directing a first cooling medium through the first cooling channel; and
   a second cooling channel which is in communication with an exterior of the housing for directing a second cooling medium through the second cooling channel,
   wherein the first cooling channel and the second cooling channel are provided to have a common heat conduction portion, and the first cooling channel is allowed to exchange heat with the second cooling channel via the common heat conduction portion, and heat absorbed by the first cooling medium is transferred from an interior of the housing to the second cooling medium and the heat is discharged to the exterior of the housing,
   wherein the motor rotor holder comprises an inner cylinder, an outer cylinder and an intermediate cylinder located between the inner cylinder and the outer cylinder,
   wherein the intermediate cylinder is arranged separately from the inner cylinder and the outer cylinder by a first support component and a second support component respectively, the first support component allowing the first cooling channel to be formed between the intermediate cylinder and the outer cylinder and the second support component allowing the second cooling channel to be formed between the intermediate cylinder and the inner cylinder, and
   wherein the intermediate cylinder serves as the common heat conduction portion.

2. The motor rotor holder according to claim 1, wherein one or more heat dissipation fins are provided on at least one of the first cooling channel and the second cooling channel.

3. The motor rotor holder according to claim 2, wherein the one or more heat dissipation fins are provided in both of the first cooling channel and the second cooling channel, and at least one of the one or more heat dissipation fins in the first cooling channel and the one or more heat dissipation fins in the second cooling channel are connected to a cylinder wall of the intermediate cylinder.

4. The motor rotor holder according to claim 3, wherein both of the one or more heat dissipation fins in the first cooling channel and the one or more heat dissipation fins in the second cooling channel are connected to the cylinder wall of the intermediate cylinder.

5. The motor rotor holder according to claim 2, wherein at least one heat dissipation fin of the one or more heat dissipation fins is provided helically in an axial direction of the cooling channel where the at least one heat dissipation fin is located.

6. The motor rotor holder according to claim 5, wherein a circulation direction of the first cooling medium in the first cooling channel is opposite to a circulation direction of the second cooling medium in the second cooling channel.

7. The motor rotor holder according to claim 5, wherein a circulation direction of the first cooling medium in the first cooling channel is the same as a circulation direction of the second cooling medium in the second cooling channel.

8. The motor rotor holder according to claim 7, wherein the one or more heat dissipation fins are provided in both the first cooling channel and the second cooling channel, and a direction of the one or more heat dissipation fins in the first cooling channel being arranged helically in the circulation direction of the first cooling medium is the same as a direction of the one or more heat dissipation fins in the second cooling channel being arranged helically in the circulation direction of the second cooling medium.

9. The motor rotor holder according to claim 7, wherein the one or more heat dissipation fins are provided in both the first cooling channel and the second cooling channel, and a direction of the one or more heat dissipation fins in the first cooling channel being arranged helically in the circulation direction of the first cooling medium is opposite to a direction of the one or more heat dissipation fins in the second cooling channel being arranged helically in the circulation direction of the second cooling medium.

10. The motor rotor holder according to claim 1, wherein a first cooling fan is provided at an opening of at least one side of the first cooling channel, which allows the first cooling medium to pass through the first cooling channel.

11. The motor rotor holder according to claim 10, the first cooling fan comprises one or more fan blades, and the one or more fan blades are connected to a cylinder wall of the intermediate cylinder.

12. The motor rotor holder according to claim 1, wherein a second cooling fan is provided at an opening of at least one side of the second cooling channel, which allows the second cooling medium to pass through the second cooling channel.

13. The motor rotor holder according to claim 12, wherein the second cooling fan comprises one or more fan blades, and the one or more fan blades are connected to a cylinder wall of the inner cylinder.

14. A motor, comprising:
   a housing;
   a stator fixedly connected to the housing;
   a rotor sleeve-coupled coaxially with the stator at an inner side of the stator, wherein an air gap is formed circumferentially between the rotor and the stator; and
   the motor rotor holder according to claim 1 rotatably provided in the housing, wherein the first cooling channel is in communication with the air gap between the rotor and the stator of the motor, which forms a first circulation circuit for the first cooling medium flowing.

15. The motor according to claim 14, wherein the stator is provided axially with one or more channels, and the first cooling channel is in communication with the one or more channels, which forms a second circulation circuit for the second cooling medium flowing.

16. The motor rotor holder according to claim 1, wherein the intermediate cylinder is rotationally connected to and sealed with the housing of the motor, which defines the first cooling channel in the housing and defines the second cooling channel outside the housing.

17. The motor rotor holder according to claim 1, wherein the first and second support components are arranged helically in an axial direction of the first cooling channel and an axial direction of the second cooling channel, respectively.

18. The motor rotor holder according to claim 1, wherein the motor rotor holder is made of an aluminum alloy material.

* * * * *